United States Patent [19]
Koziol

[11] Patent Number: 4,686,957
[45] Date of Patent: Aug. 18, 1987

[54] GAS NOZZLE ATTACHMENT
[75] Inventor: Walter Koziol, Antioch, Ill.
[73] Assignee: Modern Home Products Corp., Antioch, Ill.
[21] Appl. No.: 823,314
[22] Filed: Jan. 28, 1986

Related U.S. Application Data

[63] Continuation-in-part of Ser. No. 666,334, Oct. 30, 1984, abandoned.

[51] Int. Cl.⁴ .............................................. F24C 3/04
[52] U.S. Cl. ................................ 126/41 R; 48/180.1; 431/354; 431/355
[58] Field of Search ............. 126/41 R; 431/354, 355; 48/180.1

[56] References Cited
U.S. PATENT DOCUMENTS 1,215,153  2/1917  Hopkins .
1,919,894  7/1933  Lorimer .
2,564,371  8/1951  Parsberg ............................. 431/355
2,631,659  3/1953  Wright .
2,824,605  2/1958  Dolby ................................. 48/180.1
3,202,205  8/1965  Webster .
3,982,523  9/1976  Love et al. ......................... 48/180.1
4,267,816  5/1981  Koziol .
4,356,810  11/1982 Ferlin ................................. 126/41 R
4,373,505  2/1983  Koziol .

Primary Examiner—Carroll B. Dority, Jr.
Attorney, Agent, or Firm—Quarles & Brady

[57] ABSTRACT

A secure yet rotatable and readily releasable attachment is provided between a gas nozzle and a venturi tube for a burner in a barbecue grill. The attachment is effected such that once the attachment is made between the venturi tube and the gas nozzle it will not become detached during normal operation yet can be releasable for repair purposes. In one embodiment the attachment is provided in part by an attachment member which will be placed over the gas nozzle housing and provide a frictional engagement as well as a guide for an inwardly flanged portion of the air regulator section of the venturi tube. At the same time a rotatable engagement is afforded between the air regulator of the venturi tube and the attachment member.

13 Claims, 16 Drawing Figures

U.S. Patent  Aug. 18, 1987  Sheet 1 of 3  4,686,957
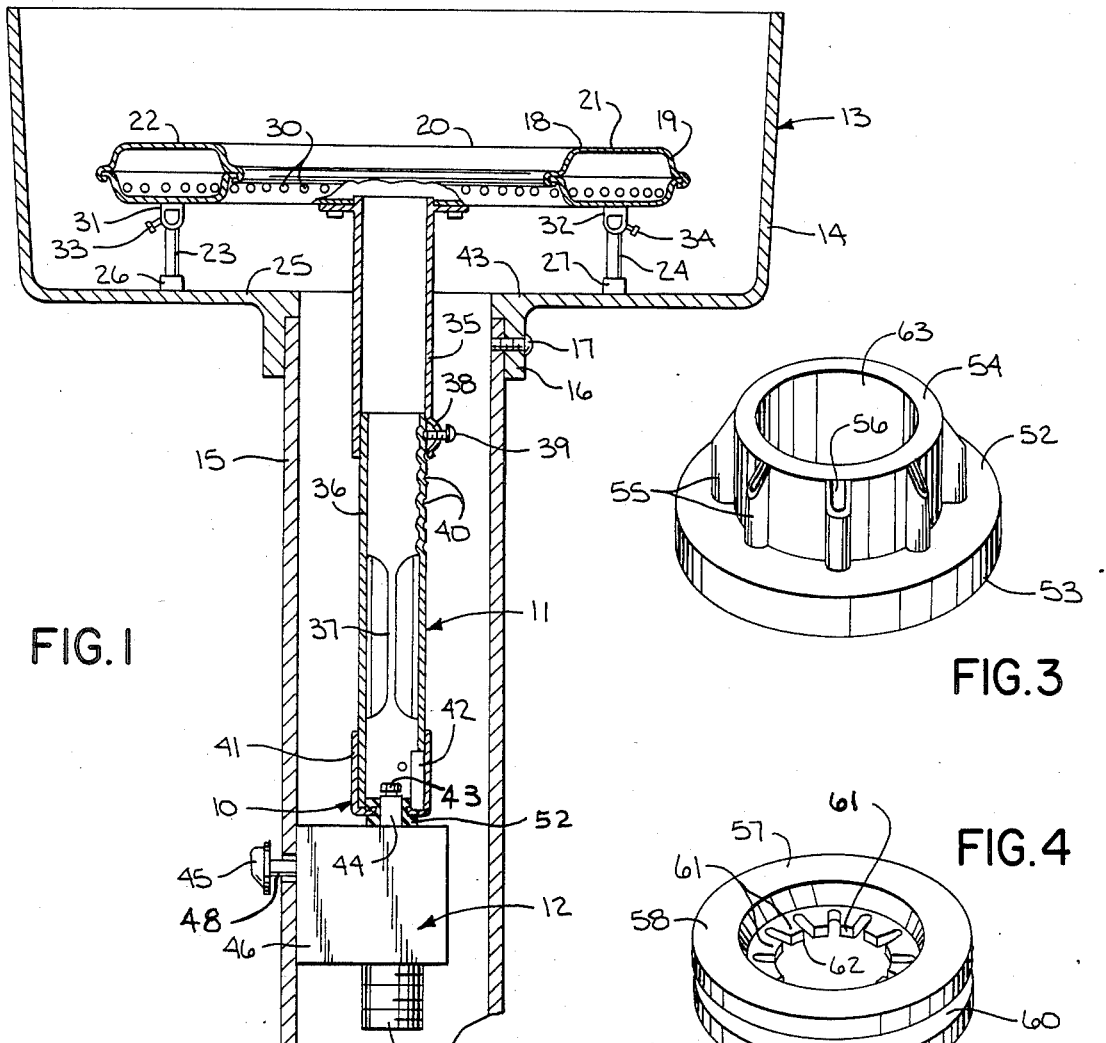

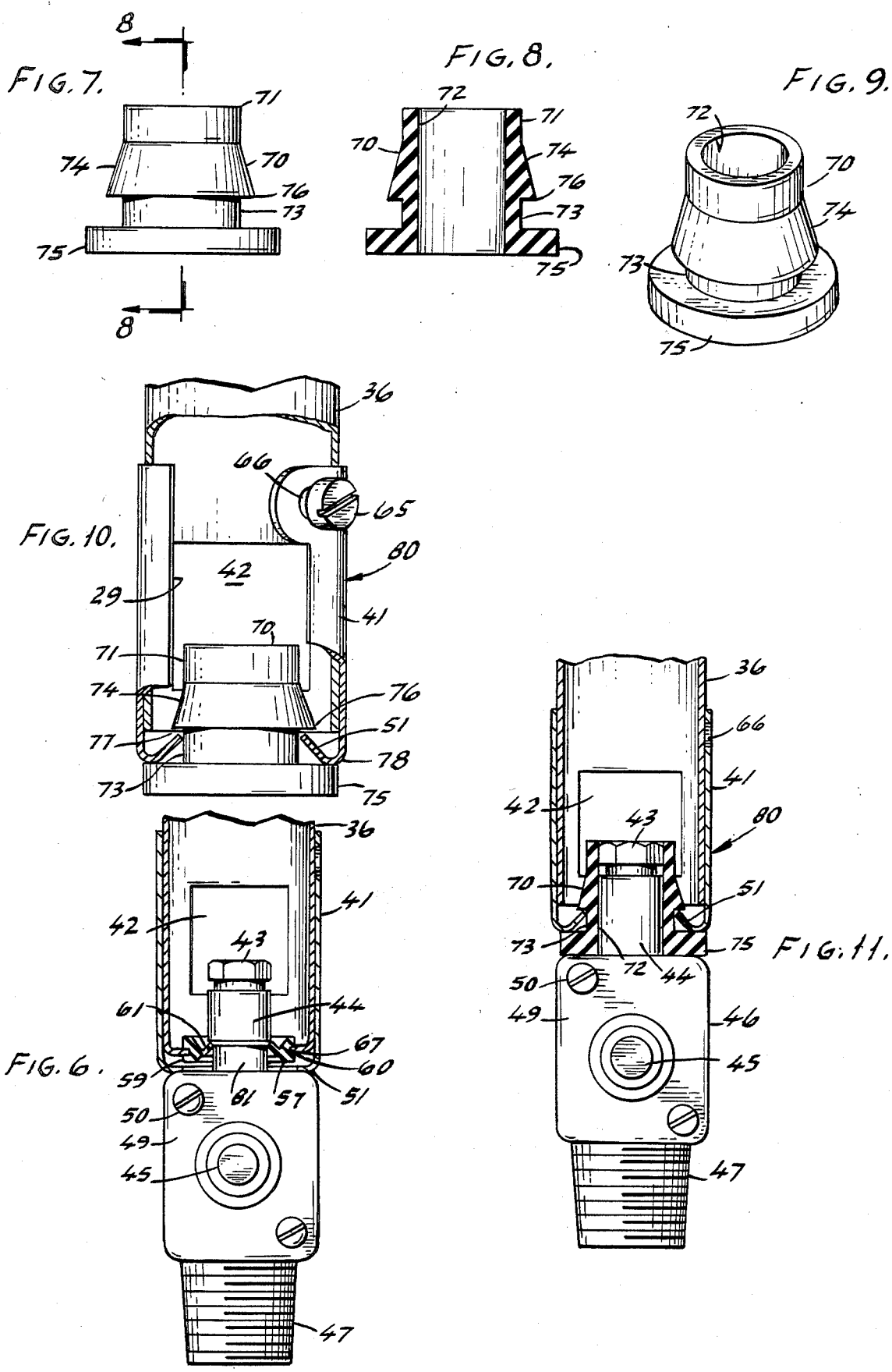

GAS NOZZLE ATTACHMENT

CROSS-REFERENCE TO RELATED APPLICATIONS

This application is a continuation-in-part of application Ser. No. 666,334 filed Oct. 30, 1984, and now abandoned.

BACKGROUND OF THE INVENTION

This invention relates to an attachment between a gas nozzle and a venturi tube assembly for a gas barbecue grill. More particularly, and in one embodiment of this invention it relates to an improved attachment member for connection between a gas nozzle and a venturi tube assembly wherein the attachment member affords a secure yet readily releasable attachment and is provided by an attachment member secured to a gas nozzle housing which will afford rotation of an inturned flange portion of the air regulator in the venturi tube assembly.

When utilizing a portable gas barbecue grill there can be a problem when it is moved over a rough surface. In this instance the venturi tube can become dislocated from the gas nozzle orifice. The venturi tube can also become dislocated from a gas orifice or nozzle in any gas barbecue grill should it be desired to clean the grill, which may involve movement of the burner to which the venturi tube is attached. When this occurs the user may not have knowledge of this dislocation. Consequently, the next time that the user ignites the burner, a problem can occur in that a torch type flame may occur in the post area with the possibility that the user could get burned or a melting of the portion of the barbecue grill burner unit.

The state of the art does not afford a means of alleviating this problem. In most instances, the interfitment between the nozzle and the venturi tube assembly is a loose one with the venturi tube merely resting by force of gravity over the nozzle orifice.

It is an advantage of the present invention to provide a secure yet readily releasable attachment between the gas nozzle and the venturi member in a gas barbecue grill. Other advantages are a secure yet readily releasable attachment between the gas nozzle and the venturi tube member in a gas barbecue grill which is easily assembled onto the gas nozzle and can be readily engaged with a venturi tube assembly; an attachment of the foregoing type which can withstand the usual operating temperature associated with a gas nozzle and a venturi tube; a unique gripper or grommet device which can afford an attachment between the nozzle and the venturi tube assembly; and an attachment means between a gas nozzle and a venturi tube assembly which can be manufactured and assembled at a minimum amount of cost.

SUMMARY OF THE INVENTION

The foregoing advantages are accomplished and the shortcomings of the prior art are overcome by the present attachment member which will provide an attachment assembly between a gas nozzle and a venturi member in a barbecue grill. The attachment assembly for the gas nozzle and the venturi member is afforded by a retaining means which can provide direct communication between a gas nozzle member and the venturi member having at least one lateral aperture and an air regulator member operatively associated with the venturi member to control the entry of air in conjunction with the lateral aperture. The venturi member also has an opening for receiving the gas nozzle member. The attachment member includes a body portion having a passageway adapted to receive the gas nozzle member. In one manner, the retaining means is an engaging means which is provided in conjunction with the body portion for direct contact with the gas nozzle member.

In one embodiment an external engagement means is provided for retentive engagement by the venturi member. The external engagement means provides contact with an internal flange portion of the venturi member or an air regulator member.

In another embodiment, the body member is of a generally tubular construction having a tubular passageway to provide an internal engaging means and an external annular groove to provide the external engagement means by the air regulator member with an internal flange portion. The body member includes a circumferential side wall portion of increasing diameter terminating adjacent the annular groove. Preferably the side wall member is of a frusto-connical configuration and has the largest diameter adjacent the annular groove. Also preferably an annular wall portion extends outwardly from the body member and forms a portion of the annular groove.

In another manner, the attachment member is provided by a grommet means positioned over the nozzle housing with the air regulator member of the venturi tube including a contact surface for frictional and rotatable contact with the grommet means. In one embodiment, the grommet means has a large and a small diameter section with compactable portions extending from the small diameter section. These compactable portions are represented by flute members which are spaced circumferentially over the outside of the small diameter section and have hollow portions with longitudinal axes aligned parallel with the longitudinal axis of the small diameter section. In another preferred embodiment, the grommet means includes a guide surface and a regulator member includes a contact surface for riding in the guide surface. More specifically, the guide surface is defined by spaced apart annular portions defining an annular groove and the grommet means includes frictional engagement projections which are spaced apart and which will engage the nozzle housing.

In additional embodiments, the retaining means between the body portion of the attachment member and the gas nozzle are provided by projections extending from an internal air shutter and internally to contact the gas nozzle member; by a one piece air shutter member having a resilient tubular portion to receive the gas nozzle and by magnetic means such as a magnet connected to the gas nozzle member to magnetically attract a metallic venturi tube.

BRIEF DESCRIPTION OF THE DRAWING

A better understanding of the present attachment assembly will be had by reference to the drawings wherein:

FIG. 1 is a view in partial vertical section of a barbecue grill unit showing the attachment assembly between a gas nozzle member and a venturi tube assembly.

FIG. 2 is an enlarged partial view in vertical section illustrating one embodiment of this invention.

FIG. 3 is a top perspective view showing the grommet device used as a portion of the attachment means in FIG. 2.

FIG. 4 is a view similar to FIG. 3 showing an alternative grommet unit.

FIG. 5 is a view similar to FIG. 2 showing the grommet unit of FIG. 4 in an alternative embodiment of the attachment assembly.

FIG. 6 is a view similar to FIG. 5 illustrating still another embodiment of the attachment assembly.

FIG. 7 is a view in side elevation illustrating another embodiment of the attachment member.

FIG. 8 is a view in vertical section taken along line 8—8 of FIG. 7.

FIG. 9 is a perspective view of the attachment member shown in FIG. 7.

FIG. 10 is a partial view of a venturi tube assembly, and in partial vertical section, attached to the attachment member of FIGS. 7 and 9.

FIG. 11 is a view similar to FIGS. 2 and 5 illustrating an attachment assembly with the attachment member of FIGS. 7 and 9 positioned on a nozzle housing.

DESCRIPTION OF THE EMBODIMENTS

Figure 12:
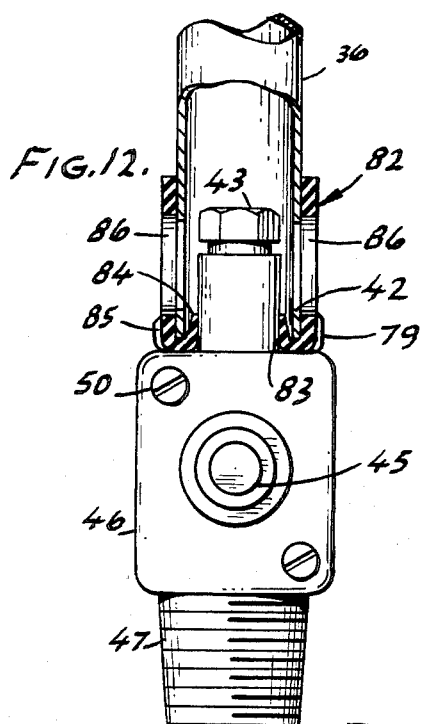
FIG. 12 is a view similar to FIG. 11 showing still another embodiment of the attachment member of this invention.

Proceeding to a detailed description of the present invention, the orifice attachment assembly generally 10 is shown in FIG. 1 in conjunction with a venturi tube assembly generally 11 and a gas control unit generally 12. The orifice attachment is utilized in conjunction with a barbecue gas grill unit generally 13 which will have the usual base member 14 supported by a post 15 which will engage a flange 16 and be secured thereto by a screw 17. A burner 18 having a hollow body 19 and a central portion 20 will have four arm portions, two of which are shown at 21 and 22, resulting in an H-shaped configuration with the apertures 30. Extending from each arm portion is a leg member such as 23 and 24 which are positioned near the end of the arm portions and in the direction of the floor 25. The leg members 23 and 24 are pivotally and extendably secured to the bottom of arm portions 21 and 22 and will contact the foot pads such as 26 and 27. The leg members 23 and 24 are slidably positioned in the tubular portions 31 and 32 and fastened by the screws 33 and 34. They are described in more detail in U.S. Pat. No. 4,267,816 by the same applicant. The venturi tube assembly 11 communicates with the burner 18 through an intake conduit or tubular passage means 35 and will be secured to a venturi tube 36 by a U-shaped extension 38 and a set screw 39 which will engage the dimples 40 on the venturi tube 35. This particular adjustment feature in the venturi tube assembly is especially suited for use with the attachment of the invention and is the subject of U.S. Pat. No. 4,373,505 by the same applicant. The venturi tube assembly 11 will include the usual finned section 37 and will have a rotatable air regulator 41 rotatably positioned over the usual lateral opening 42 of venturi tube 36.

As best seen in FIG. 2, the rotatable air regulator 41 has inwardly positioned, annular flange section 51 which will frictionally contact a grommet member 52 which is slidably positioned over the annular nozzle housing 44 from which projects the usual gas nozzle 43. This flange section 51 provides an opening in conjunction with grommet member 52 for receiving gas orifice 43. The nozzle housing 44 extends from the usual gas control housing 46 with a control stem 48 to which is attached a control knob 45 (See FIG. 1). A housing plate 49 is secured to the control housing 46 by the usual screws 50. A gas supply fitment 47 will be interconnected to the usual gas supply line (not shown).

Referring to FIG. 3, the novel grommet member 52 is shown which will include a large diameter section 53 and a small diameter section 54. Flutes 55 will extend circumferentially over the outside of the small diameter section 54 and will have hollow portions 56. The inside of small diameter section 54 will provide a sleeve 63 for frictional fitment over the nozzle housing 44.

FIGS. 4–6 show a different attachment assembly generally 28. It has the grommet member 57 for engagement with the rotatable air regulator 41 and the inturned flange section 51. The grommet member 57 is preferably formed of a flexible neoprene rubber material and will have two annular portions 58 and 59 with an annular groove 60 therebetween. The grommet member 57 will be fitted over the nozzle housing 44 with the projections 61 and the slots 62 therebetween providing frictional engagement with the nozzle housing 44. This engagement resembles in effect a Chinese torture feature attachment. FIG. 5 specifically indicates the placement of the grommet member 57 over the nozzle housing 44 as well as the rotatable engagement of the inturned flange section 51 of the rotatable air regulator 41 into the groove 60. It will be seen that the projections extend upwardly to provide a secure yet releasable attachment. In FIG. 6 the grommet member 57 has the projections 61 disposed in a reduced diameter portion 81 of the nozzle housing 44. Unlike the connection in FIG. 5, the grommet member 57 is attached to the venturi tube 36 with the inturned flange 67 thereof positioned in the annular groove 60.

FIGS. 7–11 illustrate a preferred attachment device 71 which is of a generally tubular configuration. Referring specifically to FIGS. 7–9 it will be seen that it has a body member 71 with a tubular passageway 72 extending therethrough. Disposed on the outside of the body member 71 is a groove 73 formed in part by the circumferential and tapering side wall portion 74. Side wall portion is of a frusto-connical configuration with the largest diameter section adjacent the annular groove 73. Forming the opposite side of the groove 73 is the annular wall portion 75.

As best seen in FIG. 10, attachment device 70 will be engaged by the inturned annular flange section 51 of the rotatable air regulator member 41. The usual screw 65 disposed through elongated slot 66 provides rotation of the regulator member 41 with opening 29 disposed over the lateral opening 42 of the venturi tube 36. This results in an attachment assembly 80 between the gas nozzle or orifice 43, the nozzle housing 44 and the venturi tube 36. The same components as previously described in conjunction with assembly 10 are indicated by the same reference numerals as is true with respect to all the embodiments.

FIG. 12 depicts a one piece air shutter and gripper generally 82. It has an annular body 85 with an internal resilient tubular portion 83 to grip on the nozzle housing 44. An internal groove portion 84 is provided between the tubular portion 83 and the annular body 85 to receive the venturi tube 36. Openings 86 are disposed in the annular body 85 to afford the regulation of air into the venturi tube 36 through opening 42. Extending from the body 85 are nibs 79 which assist in rotating the body 85 on the venturi tube 36.

Figure 13:
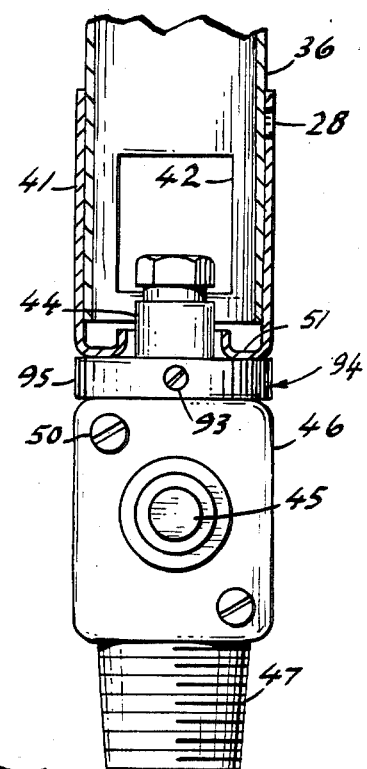
FIG. 13 is a view similar to FIG. 11 illustrating yet another embodiment of the attachment member of this invention.

In FIG. 13 a magnetic gripping arrangement generally 94 is disclosed. It includes the venturi tube 36 with the rotatable air shutter 41. In this embodiment an annular magnet 95 is positioned around nozzle housing 44 and retained thereon by the fastening screw 93. In this instance magnet 95 has a central opening (not shown) for fitting over nozzle housing 44. It will magnetically attract the metallic steel air shutter 41 by the flange section 51 to position it as shown. Alternatively, magnet 95 could be press fitted over the control housing 46 or adhesively secured thereto. In any event, the magnet will provide a six pound minimum pull force to disengage the venturi tube.

Figure 15:
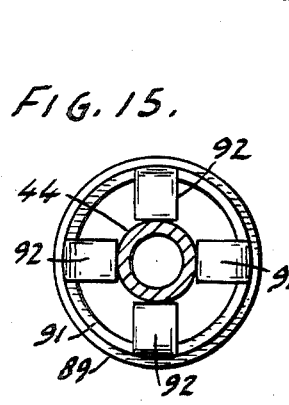
FIG. 15 is a view in horizontal section taken along line 15—15 of FIG. 14.
Figure 14:
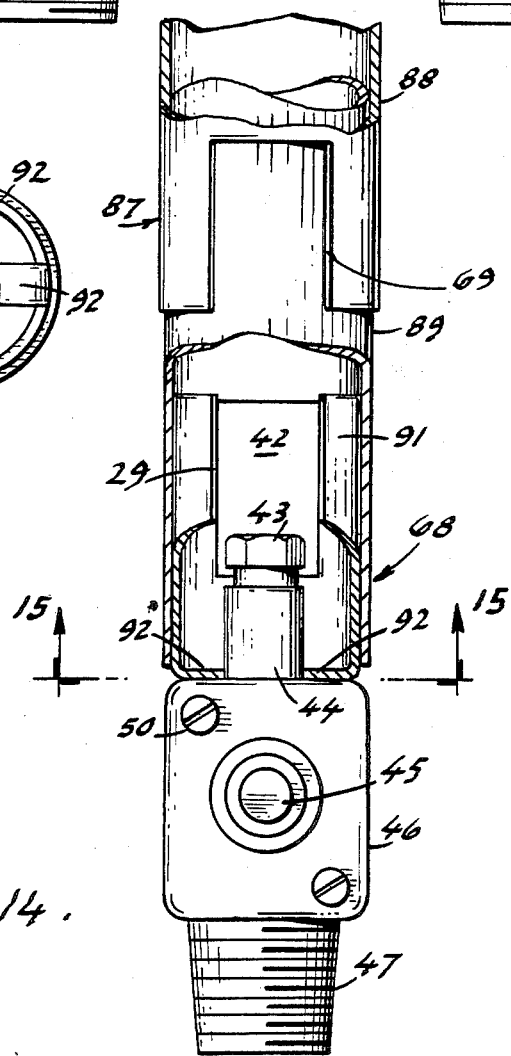
FIG. 14 is a view similar to FIG. 11 depicting a further embodiment of the attachment member of this invention.
Figure 16:
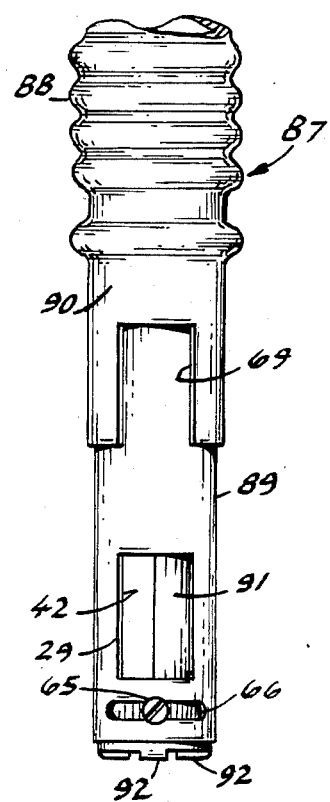
FIG. 16 is a view in side elevation showing the embodiment of FIG. 14 removed from the gas supply nozzle.

FIGS. 14–16 show a combined internal air shutter and gripper generally 68. It is illustrated in conjunction with a two piece venturi tube arrangement generally 87 having an upper flexible tubular section 88 with a smooth walled section 90 and a lower internal telescoping tube 89. Two oppositely disposed openings (one of which is shown at 42) act in conjunction with the internal tubular shutter portion 91 for air regulating purposes. Shutter portion 91 is rotatably retained inside tube 89 by the screw 65 riding in the slot 66 of tube 89. As best seen in FIG. 15, four projections 92 extend inwardly from internal tube 91 for gripping onto nozzle housing 44. U-shaped slots (one of which is designated at 69) will be further described in the Operation to follow.

OPERATION

A better understanding of the advantages of the orifice attachment assembly 10 will be had by a description of its assembly and usage. Referring first to the embodiment utilizing the grommet member 52, the sleeve portion 63 of the grommet member 52 will be aligned with and placed over the nozzle housing 44 which is best indicated in FIG. 2. When it is desired to place the venturi tube assembly 11 in communication with the nozzle housing 44 as well as the nozzle 43, all that is required is to align the venturi tube 36 therewith and to force the inturned flange section 51 over the flutes 55. This forcing will cause the flutes 55 with the hollow portions 56 to collapse and to form in effect an annular like indentation 64. This frictional engagement prevents unintentional removal of the venturi tube assembly 11 from the grommet member 52. The sleeve portion 63 of the grommet member 52 is so dimensioned that it will frictionally engage the nozzle housing 44 thus requiring an intentional force to remove the venturi assembly from its position as aligned over the nozzle housing 44. However, if desired, an intentional force could be exerted upwardly on the venturi assembly 11 thus causing the grommet member 52 to ride upwardly over the housing 44 and to displace it from the nozzle 43. In any event, any force such as movement of the grill unit 13 over a rough surface such as a patio deck will not cause the venturi tube assembly with the inturned flange 51 of the rotatable air regulator 41 to become disengaged from its position immediately surrounding the nozzle 43. It will be further appreciated that the forming of the annular indentation 64 in the grommet member 52 will afford retention of the rotatable air regulator 41 on the grommet member 52.

The same benefits as previously described for the grommet member 52 are afforded for use with the grommet member 57 and the air regulator 41. In this instance, the grommet member 57 will be placed over the nozzle housing 44 by engagement with the projections 61 in contact with the nozzle housing 44. When the grommet member 57 is placed thereon as indicated in FIG. 5, the inturned flange section 51 of the rotatable air regulator 41 will be placed in the annular groove 60. In this manner, substantial force will be required to now remove the venturi tube assembly 11 from its alignment with the nozzle 43. Of course the inturned flange section 51 could be originally placed in the groove 60 and then the grommet member 57 placed over the nozzle housing 44. To remove the venturi tube assembly 11 from its position as indicated in FIG. 5, a substantial upward force would be required but could be effected for various purposes such as cleaning or maintenance of the burner or the grill unit. As indicated earlier in conjunction with the gromnet member 52, the secure yet rotatable engagement between the air regulator 41 and the grommet member 57 will permit regulation of air through the air inlet 42. The embodiment shown in FIG. 6 will operate in substantially the same manner.

As indicated above, a grommet attachment device 70 can also be preassembled to the rotatable air regulator by the inturned annular flange section 51 which is captively retained in groove 73. This is easily accomplished by the fact that the largest diameter section, as indicated by 76, of the tapering wall portion 74 is greater than the annulus 77 formed by inturned flange section 51. Also assisting in the retentive placement of the flange section 51 in the groove 73 is the seating of the curved portion 78 against the annular wall 75. The body member 71 is preferably formed from a flexible neoprene rubber material. This affords a flexing of body member 71 and wall portion 74 to permit flange 51 and annulus 77 to pass over wall portion 74 and be seated in groove 73.

To place venturi tube 36 in sealing contact with gas nozzle 43 and nozzle housing 44, all that is required is to place tubular passageway 72 thereover. This is shown in FIG. 11. The diameter of the passageway 72 is selected so that it will afford an internal engaging means in the form of a friction fit with gas nozzle 43 and nozzle housing 44. This friction fit is of a force to resist at least an opposing ten pound pull force to remove attachment device 70 from the nozzle orifice 43 and its housing 44. Although the before mentioned engagement is effected between the attachment device 70 and the nozzle 43 and housing 44, yet captive rotation of the air regulator 41 is offered by circumferential movement of the flange section 51 in the annular groove 73.

While the attachment device 71 and the two grommet members 52 and 57 are indicated as a means for holding the venturi tube assembly 11 in fluid communication with the nozzle housing 44, other types of devices for accomplishing secure yet rotatable and releasable attachment could be employed, such as a spring member which could be frictionally placed over the housing 44 and also frictionally engage the inturned flange section 51. Neither is it required that an inturned flange section be employed for engaging either attachment device 70, a grommet member or a spring. Other commonly inturned projections could be employed such as indicated at 61 and 92 or surfaces on the air regulator 41 and the grommet members 52 and 57 such as a series of interengaging and internally extending projections such as small nibs. The air regulator member 41 has been shown with the inturned flange section 51 for engagement with the attachment members. Alternatively the inturned flange section could be formed as an integral part of the venturi tube 36 and the air shutter eliminated. Air can be regulated in conjunction with a lateral opening such as 42 in the venturi tube by suitable sizing of the opening or obstructing air flow in the venturi tube. The air regulator 41 with the inturned flange section 51 is preferably preattached to the attachment members 70, 52 and 57 by placement of the inturned flange 51 in the respective annular indentation or grooves 73, 64 and 60. Alternatively, the attachment members 70, 52 and 57 could be attached directly to the gas nozzle housing 44 and rotatable air regulator 41 force fitted thereover to place the inturned flange 51 in the respective indentations or grooves. While it is preferred to have the attachment members 70, 52 and 57 retained by the flange 51 once placed over the orifice 43, it is within the scope of this invention to have the attachment members retained by frictional engagement over the nozzle housing 44 or orifice 43 while the flange 51 is disengaged therefrom.

From the foregoing it will be obvious as to the placement and operation of embodiments 52, 68 and 94. In the instance of the combined air shutter gripper 82, it will be retained on the nozzle housing 44 by the gripping action of tubular portion 83 as it is forced in part by the placement of a portion of the venturi tube in the annular groove portion 84. In the instance of the internal air shutter and gripper 68, the attachment with the nozzle housing 44 is provided by the direct metal contact of the projections 92. With respect to magnetic gripper 94 there is magnetic attraction between magnet 95 and the metallic flange 51.

Internal air shutter and gripper 68 offers an added advantage with the internal air shutter 91 as it allows internal shutter tube 89 to be completely collapsed inside tube 87 and still allow for air intake. This is not possible with external air shutter such as 41 shown in FIG. 1. This is effected by slot 69 in tube 88 which will allow venturi opening 42 and intake slot 29 of shutter tube 91 to be aligned therein as tube 89 is moved inwardly into tube 88. This results in an added adjustment for the venturi tube 87 when it is positioned between control housing 46 and a burner 18.

The essential feature of this attachment device of this invention is the fact that the venturi tube assembly can be attached in a secure yet releasable manner in conjunction with a nozzle supplying gas to the venturi tube assembly. This is accomplished in one aspect by the unique attachment or grommet members which can be formed from various materials such as metal, heat resistant plastic or rubber. In the instance of the grommet member 52 it is important that the flutes 55 be constructed with the hollow portion 56 such that they are crushable when the inturned flange 51 is placed thereover so as to retain the flange and the venturi tube member in rotatable contact therewith.

It will thus be seen that through the present invention there is now provided a unique attachment member for attaching a venturi tube assembly in conjunction with a gas nozzle. The attachment member will provide a secure yet readily releasable attachment with the pull force being easily adjustable. At the same time, there is provided rotation of the air regulator. The attachment is provided in a manner that is readily adapted to a standard venturi tube assembly with an attachment afforded by an attachment member or grommet which can be manufactured at low cost. The attachment members as disclosed herein can be readily placed over a standard gas nozzle without special tooling and with a minimum amount of assembly.

The foregoing invention can now be practiced by those skilled in the art. Such skilled persons will know that the invention is not necessarily restricted to the particular embodiments presented herein. The scope of the invention is to be defined by terms of the following claims as given meaning by the preceding description.

I claim:

1. An attachment member to provide an attachment between a gas nozzle and a venturi member and air regulator member assembly in a gas barbecue grill, the venturi member having at least one lateral aperture and the air regulator member operatively associated with the venturi member to control the entry of air, the assembly also having an opening for receiving the gas nozzle member, the attachment member comprising:

retaining means operatively associated with said venturi member and air regulator member assembly to provide linear attachment and linear release between said assembly and said nozzle member with ready release of said assembly from said gas nozzle member, said retaining means including a grommet of resilient material, an end portion of said venturi member or said air regulator member being attached to said grommet in a frictional manner and an inner portion of said grommet having means for releasingly engaging said nozzle.

2. The attachment member of claim 1 wherein said retaining means includes a body portion having external engagement means and for retentive engagement by said air regulator member.

3. The attachment member of claim 2 wherein the body portion is of a generally tubular construction having a tubular passageway to provide internal direct contact engaging means and an external annular groove to provide said external engagement means.

4. The attachment member of claim 3 wherein said body portion includes a circumferential side wall portion of increasing diameter terminating adjacent said annular groove.

5. The attachment member of claim 4 wherein said side wall member is of a frusto-connical configuration.

6. The attachment member of claim 4 wherein the largest diameter of said increasing diameter wall portion is adjacent said annular groove.

7. The attachment member of claim 6 further including an annular wall portion extending outwardly from said body portion and forming a portion of said annular groove.

8. The attachment member of claim 7 wherein said resilient material is of a rubber composition.

9. The attachment member as defined in claim 2 wherein said external engagement means is provided by a guide surface.

10. The attachment member as defined in claim 9 wherein said guide surface is defined by spaced apart annular portions defining an annular groove.

11. The attachment member as defined in claim 1 wherein said means for releasingly engaging said nozzle is defined by spaced apart projections.

12. A secure yet releasable attachment between a gas nozzle and a venturi member in a gas barbecue grill comprising:
- a gas nozzle member defining a housing;
- a venturi tubular member defining at least one lateral aperture;
- an air regulator member slidably received by said tubular member at one end thereof to controllably cover said lateral aperture;
- an opening defined by said venturi tubular member adapted to receive said gas nozzle member; and
- attachment means operatively associated with said gas nozzle member and said venturi tubular member, said attachment means including frictional engaging members constructed and arranged to provide a secure yet readily reasonable interfitment as well as rotation of said air regulator member, said attachment means being defined by grommet means positioned over said nozzle housing and includes a guide surface, and said regulator member includes a contact surface for rotation in said guide surface, said guide surface being defined by spaced apart annular portions defining an annular groove, and said frictional engaging members being defined by spaced apart projections.

13. An improved gas burner assembly for a gas barbecue grill comprising:
- a burner element;
- a gas nozzle member defining a housing;
- a venturi tubular member defining at least one lateral aperature;
- an air regulator member slidably received by said tubular member at one end thereof to controllably cover said lateral aperture;
- an opening defined by said venturi tubular member adapted to receive said gas nozzle member;
- attachment means operatively associated with said gas nozzle member and said venturi tubular member at one end of said venturi tubular member, said attachment means including frictional engaging members constructed and arranged to provide a secure yet readily releasable interfitment as well as rotation of said air regulator member; and
- tubular passage means to interconnect said burner element and said venturi tubular member at the end opposite said interfitment, said attachment means being defined by grommet means positioned over said nozzle housing and includes a guide surface, said regulator member includes a contact surface for rotation in said guide surface, said guide surface being defined by spaced apart annular portions defining an annular groove, said grommet means including frictional engagement means for engaging said nozzle housing, and said frictional engagement means being defined in part by space apart projections.

* * * * *